United States Patent Office 2,846,853
Patented Aug. 12, 1958

2,846,853

HIGH PRESSURE SCRUBBER LIQUEFIER IN AIR SEPARATION SYSTEMS

Ladislas C. Matsch, Kenmore, N. Y., assignor to Union Carbide Corporation, a corporation of New York Application June 1, 1954, Serial No. 433,436

27 Claims. (Cl. 62—14)

This invention relates to a process of and apparatus for separating air by low temperature rectification and more particularly to an improved process and system for eliminating carbon dioxide and other higher boiling point impurities during or prior to the rectification of air to separate it into its main components and for avoiding difficulties caused by accumulation of solid carbon dioxide.

In low temperature air separation systems in which the air at super-atmospheric pressure is to be cooled by indirect countercurrent heat exchange with outgoing separation products, it has been customary to reduce or eliminate the carbon dioxide content of the air by preliminarily treating the air chemically or by contacting it with adsorbents prior to cooling it to temperatures below $-80°$ C. The preliminary removal of the carbon dioxide was considered essential to avoid difficulty due to deposition of solid carbon dioxide particles on heat exchanger surfaces. When it was attempted to operate such a system without employing the expensive chemical removal of carbon dioxide, the countercurrent heat exchanger had to be provided in duplicate so that one heat exchanger could be thawed while the other was in operation. This, however, in addition to the considerable investment cost of supplying a duplicate countercurrent heat exchanger, caused substantial refrigeration losses when the heat exchanger was warmed for thawing and recooled to operating temperature.

In a system in which incoming air under substantial pressure is divided into two streams, one of which is cooled in a countercurrent heat exchanger by effluent nitrogen from the rectifying column and the other passed through an expansion engine, it has been discovered that excessive carbon dioxide precipitation in the countercurrent heat exchanger can be avoided if the temperature of the air while at supply pressure is not reduced below about $-140°$ C. and if the air is not contacted with heat exchange surfaces at temperatures below $-155°$ C. However, in order to maintain such thermal conditions in the countercurrent heat exchanger, more air must be passed through the countercurrent heat exchanger and less through the expansion engine than corresponds to maximum efficiency of the cycle. This excess air through the countercurrent coil results in loss of oxygen production under limited refrigeration conditions. On the other hand, if sufficient refrigeration is available, the power consumption per unit of air processed is higher than that required for chemically cleaning systems in which the air temperature at the cold end of the countercurrent heat exchanger is lower.

Principal objects of the present invention are to provide a process of and apparatus for eliminating carbon dioxide and other impurities from air to be rectified which avoids the need for a chemical or preliminary adsorption removal of carbon dioxide from the air processed, or the need for at least a partial preliminary removal of the carbon dioxide content; which avoids the difficulties caused by precipitation of solid carbon dioxide in countercurrent heat exchangers used for cooling air to low temperatures; which provides for the operation of countercurrent heat exchangers that cool the air by heat exchange with separation products under such conditions that the carbon dioxide is not deposited in such heat exchanger while avoiding a loss in efficiency and in the production of the desired constituents.

These and other objects and advantages of this invention will be apparent from the following description and accompanying drawing in which.

Figure 1:
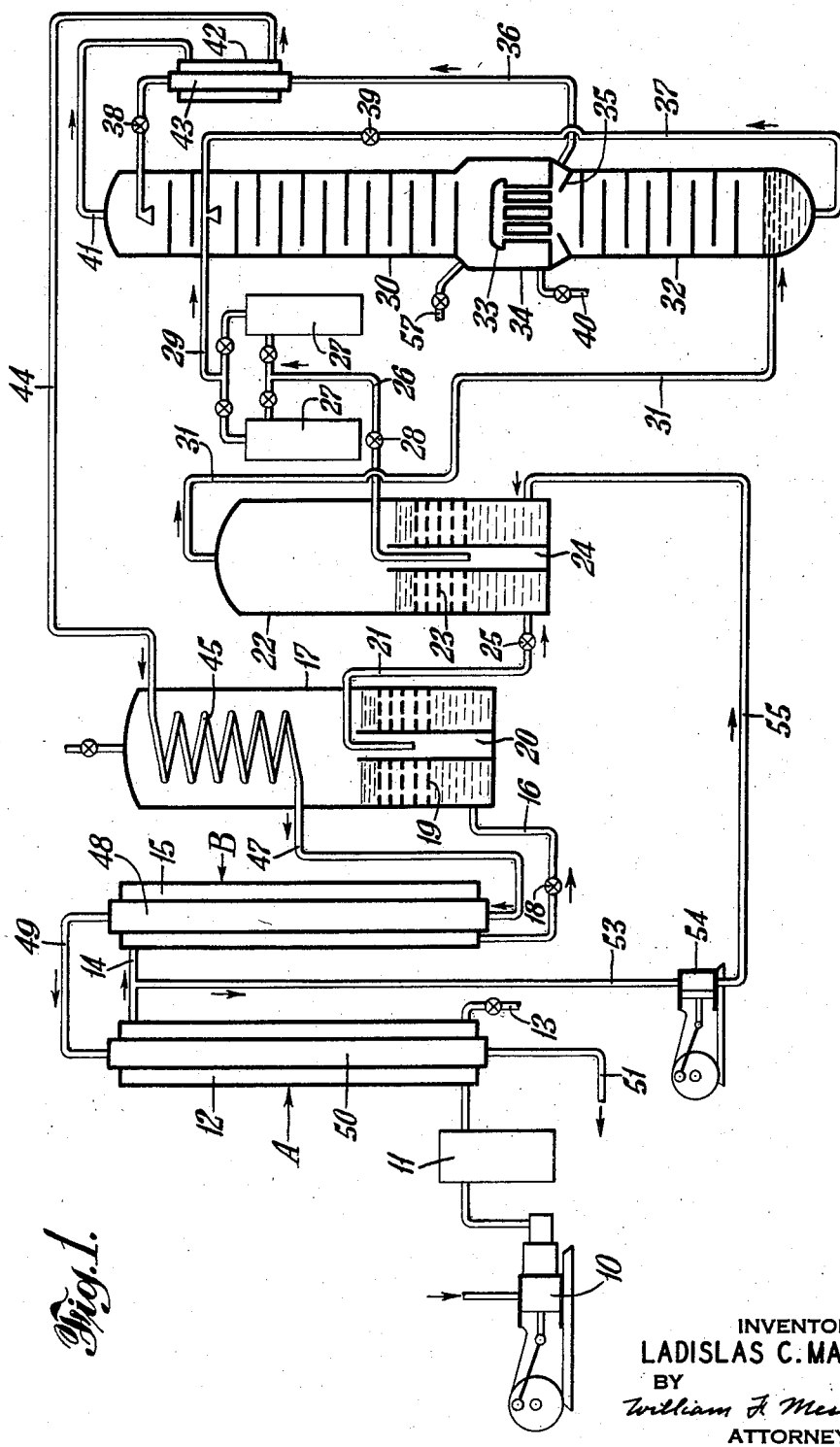
Fig. 1 shows a flow diagram of a system for the separation of air according to the present invention.

According to the present invention, air containing atmospheric impurities including carbon dioxide is compressed to a relatively high pressure and treated as by cooling sufficiently that substantially all the water vapor is condensed and removed. A stream of such air is then countercurrently cooled by at least the nitrogen product of separation to a temperature of about $-140°$ C. but not below $-155°$ C. Under such conditions of pressure and temperature, i. e. pressure above 550 p. s. i. g. and close to but not below $-155°$ C., it was discovered that the carbon dioxide remains dissolved in the air and is not precipitated. Such air when throttled to an intermediate pressure of about 270 p. s. i. g. is scrubbed with a liquid air fraction which liquid air may be that resulting from expansion of the stream to the intermediate pressure and which can be augmented by liquid produced by heat exchange between some of the scrubbed air and a colder fluid of the system such as the nitrogen-rich separation product before it is used to cool the air in the countercurrent heat exchanger. By this expedient the air which is liquefied is stripped of its carbon dioxide content so that precipitation of carbon dioxide on heat exchanger surfaces of the liquefier will not occur. This heating of the nitrogen before passage through the countercurrent heat exchanger avoids cooling of the air below $-140°$ C. even when the smaller optimum proportion of the air supply is passed through the countercurrent heat exchanger. By warming the nitrogen in the liquefier, its temperature is kept closer to the $-140°$ C. air outlet temperature, thus avoiding the large thermodynamic loss which accompanies a large product-refrigerant heat exchanger temperature differential.

All of the preliminarily scrubbed air stream including the liquid portion containing carbon dioxide is then further throttle expanded and passed into a portion of apparatus functioning as a second scrubber. The second expansion causes a flash-off of some of the liquid into vapor and this vapor is scrubbed by the liquid fraction so that the liquid fraction contains the carbon dioxide and also any other higher boiling point impurities. The vapor portion can then be passed to the rectifying column for further heat exchange and rectification and the liquid fraction is cleaned of impurities by subjecting it to an impurity removing operation, for example, passage through filters and/or adsorbent material, then the cleaned liquid fraction is passed to the rectification.

While some air separation systems employ only a single high pressure air stream, certain efficient systems employ also a stream at a lower pressure substantially equal to or only slightly higher than the pressure of a first stage rectification, namely from 60 to 120 p. s. i. g. Such lower pressure air stream, after cooling to a low temperature, is introduced into the second scrubber so that its carbon dioxide content and impurities can be scrubbed out to remain with the liquid fraction employed for scrubbing. In one of such efficient systems that requires a substantial amount of low temperature refrigeration for the production of liquid oxygen, a part of the preliminarily cooled and moisture freed compressed air is expanded with the production of external work to form the lower pressure stream and such work-expanded air stream is passed to the second scrubbing operation. When the oxygen product is to be delivered in the gaseous state at substantially room temperature the oxygen product is passed through separate passage in the heat exchange system to recover its refrigeration in which case either none or a smaller amount of the total air processed need be expanded with the production of external work dependent upon the initial air pressure.

Referring now to the drawing and particularly to Fig. 1: Air is compressed in a multi-stage compressor 10 to a pressure of about 3000 p. s. i. g. and the heat of compression removed by a water-cooled cooler 11. Lower head pressures, for example 2000 p. s. i. g., could be alternatively employed if an air forecooler cooled by an externally supplied refrigerant were also used. The air is then passed through one passage 12 of a heat exchanger A which cools the air sufficiently to eliminate most of the water vapor. The heat exchanger A conveniently can be provided in duplicate with suitable pipe connections so that one can be thawed while the other is in operation, the water being drained from the warm end through a drain connection 13. From the cold end of passage 12 a conduit branch 14 conducts a substantial portion of the air to the warmer end of a passage 15 in a countercurrent heat exchanger B. In heat exchanger B the air stream is cooled to about −140° C. and leaves through conduit 16 which conducts it into the lower part of a scrubber chamber 17.

The scrubber chamber 17 is preferably operated at a pressure of about 270 p. s. i. g. and, therefore, a throttle or an expansion valve 18 is interposed in the conduit 16. The lower part of the scrubber chamber 17 has disposed therein gas and liquid contact devices such as perforated plates 19 and an overflow cup 20 which keeps the liquid level at least above the plates 19. The plates 19 effect scrubbing contact between incoming vapor and the liquid air in the chamber. The air stream either entirely or mostly in liquid state then is conducted from the cup 20 by a conduit 21 to a lower portion of a second scrubber chamber 22.

The second scrubber chamber also has contact plates 23 and an overflow cup 24 and the conduit 21 has interposed therein an expansion valve 25 which reduces the pressure of the air stream from about 270 p. s. i. g. to about 75 to 90 p. s. i. g. The pressure reduction results in a flash-off of some of the liquid into vapor state which is scrubbed by the liquid fraction in the chamber 22. This scrubber liquid fraction is then conducted from the overflow cup 24 by a conduit 26 to impurity removing means such as filters 27. The liquid fraction, after having the solidified impurities including carbon dioxide removed by the filters 27, is passed by conduit 29 to an intermediate portion of a rectifying column 30 that effects the second or lower pressure stage of rectification of the air. The vapor portion of the air stream that rises in the scrubber chamber 22 is passed from the top thereof through a conduit 31 to the lower part of a rectifying column chamber 32 that constitutes a higher pressure rectification stage.

The rectifying column may be of the customary type in which the lower pressure second stage is mounted above the higher pressure first stage and a condenser 33 receiving vapors from the chamber 32 is disposed within a chamber 34 at the base of the upper column 30 so that the condenser is cooled by liquid oxygen collected in chamber 34 for vaporizing a portion of the oxygen to produce vapors for operation of the rectifying column 30, and to effect liquefaction of substantially pure nitrogen vapor which provides reflux for the lower column 32 and which produces liquid nitrogen collected on a shelf 35 to be transferred by conduit 36 to the upper end of the column 30. The liquid produced and collected in the lower part of the lower column 32 is passed by a transfer conduit 37 to an intermediate part of the upper column 30. The transfer conduits 36 and 37 are controlled by expansion valves 38 and 39, respectively. The liquid oxygen product is withdrawn from the chamber 34 through a valve controlled conduit 40. If gaseous oxygen product is desired, it may be withdrawn from a connection 57 at a high point of the chamber 34.

The nitrogen-rich product of the rectification in upper column 30 is withdrawn from the top thereof through conduit 41 and partly warmed by passage through a heat exchanger 42 that effects heat exchange with the liquid nitrogen transferred through the conduit 36, a passage 43 of the heat exchanger 42 being interposed in the conduit 36. From the heat exchanger 42 a conduit 44 conducts the effluent nitrogen to a heat exchanger coil 45 that is disposed within the upper part of the scrubber chamber 17. The coil 45 warms the effluent nitrogen from about −180° C. to about −160° C. and this heat exchange effects liquefaction of scrubbed air that falls from the coil 45 to join with the liquid in the scrubber. After warming in coil 45, the effluent nitrogen is passed by a conduit 47 to the cold end of a passage 48 through the countercurrent heat exchange B. A connection 49 conducts the partly warmed nitrogen to the cold end of a passage 50 through the heat exchanger A and the warmed nitrogen is delivered from the passage 50 through a conduit 51.

For the production of low temperature refrigeration and for providing a stream of cold air at condensation pressure a substantial portion of air is diverted from conduit 14 through a branch conduit 53 to an expansion engine 54. The expansion engine may be of the customary type which is coupled to power absorbing means so that the expansion takes place with the production of external work and the air is cooled by such expansion to a temperature close to its condensation temperature at the reduced pressure. Such reduced pressure is preferably that of the second scrubber chamber 22 between 60 and 120 p. s. i. g., and the expanded air is conducted by a conduit 55 to the lower part of the chamber 22 to be scrubbed therein. The vapor of the scrubbed second stream joins with the vapor of the first stream and both pass to the higher pressure stage 32 through conduit 31.

Figure 2:
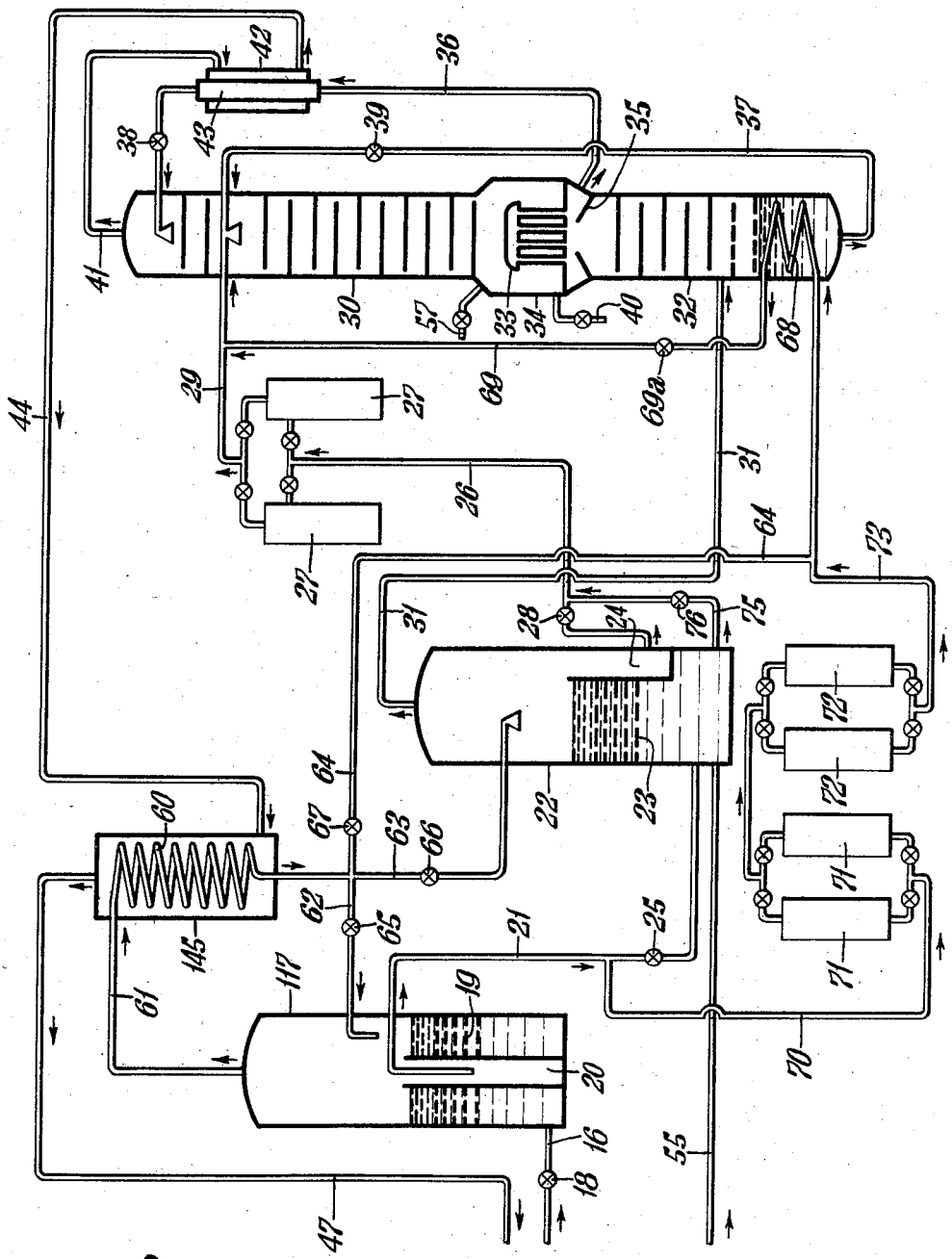
Fig. 2 is a flow diagram of a system similar to that of Fig. 1 but modified to include a liquefying heat exchanger separate from the scrubbing chambers.

The system of Fig. 2 differs from that of Fig. 1 in that the higher pressure scrubber 117 does not have the heat exchange coil 45 in its upper portion but instead there is alternatively provided a separate liquefying heat exchanger 145 with one end connected to the nitrogen product conduit 44 and the other end connected by conduit 47 with the counter-current heat exchanger passage 48. A condensing element or coil 60 in heat exchanger passage 145 has its upper end connected to the upper end of chamber 117 by a connection 61 to receive and condense scrubbed vapor from the scrubber 117. The liquid discharge end of coil 60 is connected to branch pipes 62, 63 and 64 each controlled respectively by valves 65, 66 and 67. Branch 62 connects with chamber 117 and when valves 66 and 67 are closed the liquid fraction condensed is all conducted into the scrubber 117 so that the mode of operation is similar to the operation of Fig. 1.

When, as explained later, all or a part of the condensed liquid fraction is to be sent directly into the scrubber 22, the valve 66 is opened and the valve 65 is either closed or adjusted and condensed liquid is conducted by pipe 63 into scrubber 22 to which the pipe is connected. The liquid is throttled to the pressure of chamber 22 by the valve 66. The branch 64 is provided for a further alternative mode of operation and is preferably connected to a heat exchange coil 68 disposed in the sump or lower portion of chamber 32. From coil 68 a conduit 69 conducts the liquid fraction to the upper column 30, the conduit 69 having a throttling valve 69a interposed and being connected to the conduit 29. Thus with valves 65 and 66 closed and valve 67 open, the liquid fraction is cooled to the temperature of the liquid in the sump of column 32 and throttle expanded through valve 69a into the upper column. As desired, the amount of the liquid fraction passed through the branches 62, 63 and 64 may be proportioned as required to maintain the desired liquid levels and to regulate the amount of scrubber liquid flowing from chamber 117 through chamber 22 and filters 27. In this manner only enough scrubber liquid is circulated to provide the desired scrubbing action and the scrubber 22 and filters 27 need not handle excess liquid.

When sufficient scrubber liquid results from the throttle expansion at valves 18 and 25, all the liquid fraction can be passed through branch 64. When there is sufficient liquid made by throttling through valve 18 for the scrubbing in chamber 117, but not enough for the second scrubbing of the additional air in chamber 22, then liquid fraction as required is added to chamber 22 by branch 63 and any excess is passed through branch 64. The arrangement also provides for regulation of the amount of liquid fraction condensed in coil 60 and thereby a control to insure that the nitrogen product is heated to the desired temperature.

A still further modification can be carried out by providing a conduit 70 connected to conduit 21 before the valve 25. The conduit 70 connects to impurity removing devices such as filters 71 and adsorbent traps 72 in series from which a conduit 73 conducts cleaned scrubber liquid to the cooling coil 68 before throttle expansion through valve 69a into the upper column 30. Such further modification is employed when there is sufficient liquid resulting from the expansion through valve 18 to scrub the higher pressure air stream, for example when the head pressure is high enough. In such case the valves 25, 65 and 67 are shut and the first scrubber liquid passes through conduit 70 to filter 71, adsorber 72, and then through conduit 73 to cooling coil 68. The cooled liquid is finally throttle expanded through valve 69a in conduit 69 to upper column 30. The scrubber 22 is supplied with clean condensed air through valve 66 and conduit 63 to countercurrently wash the condensation pressure air stream entering through conduit 55. Preferably the valve 28 is closed and the used scrubber liquid is drawn from the bottom of scrubber 22 by a conduit 75 having an expansion valve 76 therein and connected to conduit 26 so that the second scrubber liquid may be cleaned at 27 and passed to the column 30. If desired the cleaned first scrubber liquid could be passed to the lower column 32 by connecting the conduit 73 directly to the column chamber 32 instead of to the boiling coil 68.

Figure 3:
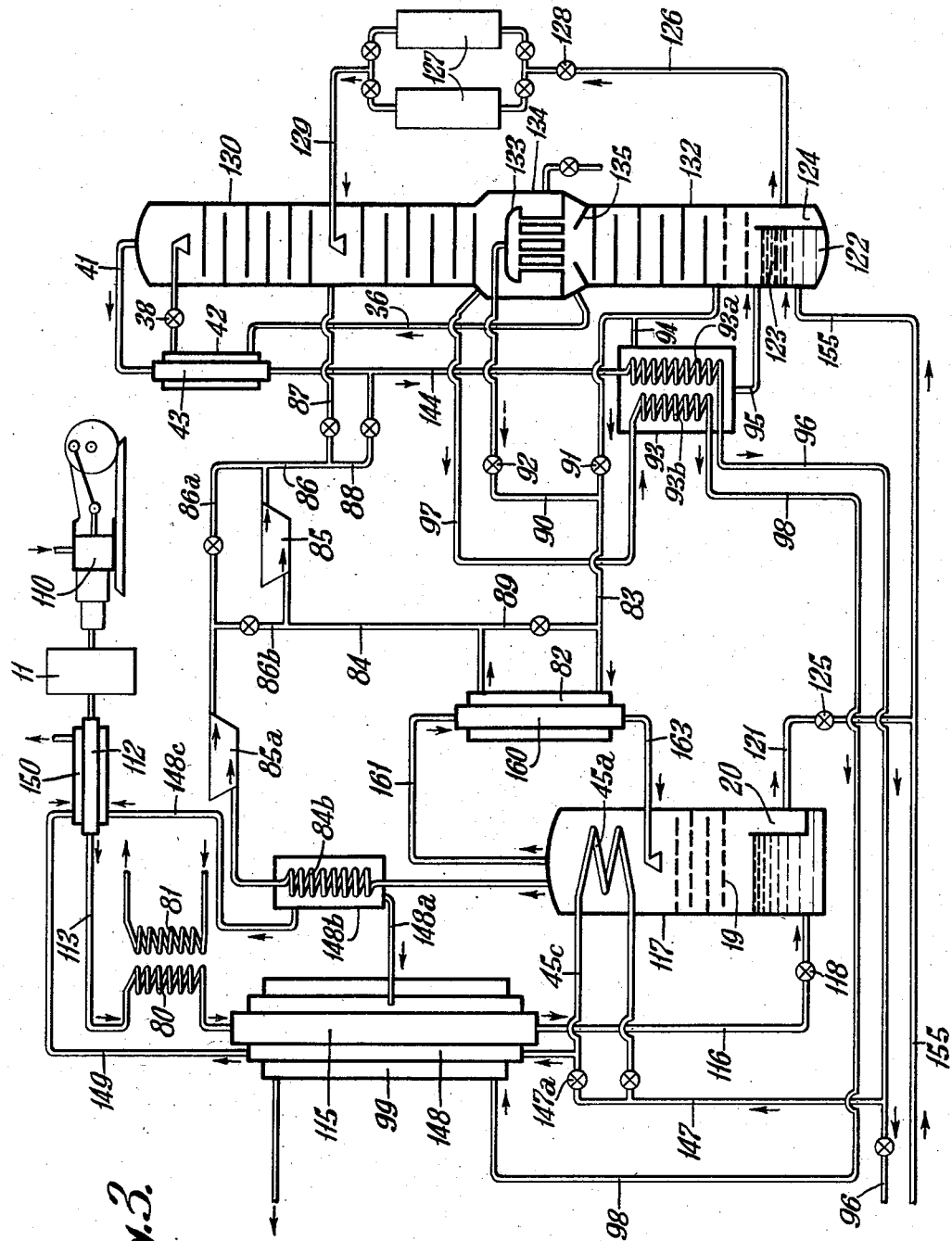
Fig. 3 is a flow diagram of a modified embodiment of the invention.

The system of Fig. 3 differs from that of Fig. 1 in that the second scrubber 22 is eliminated as an independent chamber and is built into the base of the high pressure chamber rectifying column. The features which correspond to those of Fig. 1 are designated by the same reference characters. In Fig. 3 the lower column chamber 132 is extended downwardly to provide a scrubber portion 122 having gas and liquid contact plates 123 therein and an overflow cup 124. The liquid stream from first scrubber chamber 117 after expansion through valve 125 is conducted by conduit 155 into the lower part of the portion 122. A second air stream at condensation pressure and cooled preferably by regenerative or passage switching heat exchange with effluent nitrogen to substantially condensation temperature with simultaneous elimination of moisture and most of the carbon dioxide is conducted by conduit 155 also into the lower part of the scrubber section 122. The scrubbed vapors rise in the column 132 in contact with descending reflux liquid so that a nitrogen fraction is liquefied by the condenser 133, part of which nitrogen forms the reflux for the column 132 and the remainder of which is collected on a shelf 135 for transfer to the upper column. The liquid fraction remaining after expansion through the valve 125 combines with the oxygen-rich liquid produced by the column 132 and the mixture, carrying precipitated carbon dioxide and impurities, is conducted by conduit 126 controlled by expansion valve 128 to the impurity removing devices 127 which may be similar to the devices 27 of Fig. 1. The cleaned liquid is then conducted by conduit 129 to an intermediate part of the upper column 130.

The system of Fig. 3 may be termed a dual pressure cycle because one stream of the air is supplied at condensation pressure of from 60 to 120 p. s. i. g. through the line 155 free of moisture and most of the carbon dioxide as previously mentioned. The remainder of the air constituting a high pressure air stream is provided by a high pressure compressor 110 at pressures ranging from 500 to 3000 p. s. i. g. as required. A preferable pressure would be 2000 p. s. i. g. when the forecooler 80 is employed. The air is conducted through a pass 112 of a heat exchanger and then by conduit 113 to a heat exchanger passage 80 constituting part of a forecooler that is refrigerated by a suitable refrigerant passed through a heat exchanger passage 81. Heat exchanger passage 112 and forecooler 80 cool the high pressure air stream sufficiently to eliminate the moisture. From the forecooler 80 the high pressure stream is conducted through countercurrent heat exchanger passage 115 and cooled to a temperature of about −140° C. From passage 115 a conduit 116 conducts the high pressure stream to the lower part of scrubber 117 after it is throttled through valve 118.

Scrubber liquid in the higher pressure scrubber 117 may be augmented by condensation of some or all of the scrubbed air. To this end there is provided a heat exchanger passage 160 connected by conduit 161 with the upper end of chamber 117 and by conduit 163 with a suitable point of the chamber 117. Heat exchanger passage 160 is cooled by a heat exchanger passage 82 through which a cold fluid of the system is conducted.

The cold fluid of the system may be a vapor which is to be warmed so that it can be expanded with production of external work for usefully producing refrigeration. Such vapor may be drawn from the lower column chamber 132 by a conduit 83 connected between chamber 132 and passage 82. From the warmer end of passage 82 a conduit 84 conducts the warmed vapor to an expansion turbine 85 from the discharge of which a conduit 86 conducts the expanded cold vapor through a conduit 87 to the upper column chamber 130 or through a branch conduit 88 to the outflowing waste nitrogen conduit 144, the branches 87 and 88 being controlled by valves therein. A valve controlled by-pass 89 may be connected between conduits 83 and 84 for adjusting the temperature of the vapor flowing to the expander 85. If desired, the vapor which is to be warmed in the heat exchanger passage 82 may be nitrogen-rich vapor from the condenser 133 or upper end of the chamber 132 which is conducted by a conduit 90 connecting with the conduit 83, valves 91 and 92 being interposed in the conduits 83 and 90 to select the desired vapor.

In order that the temperature of the outflowing products may be increased so that the inflowing air streams are not too deeply cooled prior to expansion and scrubbing, a liquefier 93 is associated with the lower column chamber 132. The liquefier 93 receives vapor from chamber 132 by branch connection 94 and delivers the condensed air vapor to the scrubber portion 122 of the chamber by a conduit connection 95. The effluent nitrogen is conducted by conduit 144 to heat exchange coil 93a in the liquefier 93 from which a conduit 96 conducts the warmed nitrogen effluent to the initial heat exchangers. The gaseous oxygen product is withdrawn by the conduit 97 from the upper portion of the boiling chamber 134 and conducted to heat exchange coil 93b in the liquefier 93. From coil 93b a conduit 98 conducts the warmed oxygen product to the cold end of heat exchanger passage 99 in heat exchange with the countercurrent passage 115. A suitable portion of the outflowing effluent nitrogen is taken from conduit 96 by a branch conduit 147 connecting to the cold end of a heat exchanger passage 148 also in heat exchange with a countercurrent passage 115. From the warmer end of passage 148 a conduit 149 conducts the effluent nitrogen to heat exchanger passage 150 in heat exchange relation to the incoming air passage 112. If required, the temperature of the outgoing nitrogen for heat exchanger passage 148 may be adjusted by diverting a desired amount through a heat exchange coil 45a connected by conduits 45b and 45c to conduit 147 on each side of a control valve 147a therein.

Refrigeration for the system may also be provided by directly work expanding the vapor from the chamber 117 instead of liquefying same through heat exchanger 160. To this end scrubbed gas from chamber 117 is passed through conduit 84a to a turbo-expander 85a. To prevent condensation in the turbine, this gas is warmed in a turbine preheat coil 84b by a suitable nitrogen side bleed 148a from pass 148 of the countercurrent heat exchanger. The bleed connection 148a connects to heat exchanger passage 184b around coil 84b and a conduit 148c conducts the cooled nitrogen side bleed to joint the main nitrogen stream 149 in pass 150 to cool the incoming air in pass 112. The expanded air may be passed through conduit 86a to the conduit 86 when the expansion is to the pressure of the upper column chamber 130 or the expanded vapor may be conducted by a branch conduit 86b to the inlet of the expander 85, in which case the expansion by the expander 85a would be to the condensation pressure of between 60 and 120 p. s. i. g.

It is believed that operation of the system will be clear from the above detailed description. In liquid oxygen production cycles of the type of Fig. 1 but operating without the benefit of this invention, the air temperature out of the countercurrent heat exchangers is about −140° C. when the nitrogen inlet temperature is −180° C. The deposition of $CO_2$ on the tube walls of the countercurrent heat exchanger is controlled by the tube wall temperature which is intermediate between −140° C. and −180° C., and probably about −160° C. It has been proven by tests that a cycle incorporating the present invention results in a superior thermal condition; the nitrogen then enters the countercurrent heat exchanger at −160° C. and the resulting tube wall temperature is about −150° C. Thus the theoretical $CO_2$ deposition temperature of −155° C. at 1200–3000 p. s. i. g. is avoided and the actual deposition reduced to a negligible quantity.

In addition to obtaining these advantages, an optimum amount of high pressure air is processed and is cooled without $CO_2$ deposition difficulties to an optimum temperature in the first scrubber of about −155° C. at 270 p. s. i. g. The $CO_2$ can then be removed without further deposition difficulties by further expansion and scrubbing at a lower pressure.

In any cycle of the scrubber liquefier type the amount of high pressure air cooled against effluent nitrogen is that which reaches about −140° C. in the countercurrent heat exchanger and the overall refrigeration balance is satisfied by choosing the head pressure properly, and/or by cooling some air by regenerators at lowest pressure as in the system of Fig. 3.

The cleaning of the scrubber liquid before passage to the rectification can be effected in several ways such as by passage through porous ceramic filters; by passage through chambers containing an adsorbent such as silica gel to remove some dissolved impurities as well as solid particles; or by recirculation of scrubber liquid through filters and adsorbent chambers. Also, if desired, a set of filters could be interposed in the conduit 21 or 121 before the second scrubbing to reduce the concentration of impurities to be removed from the second scrubber liquid. This may be advantageous in a gaseous oxygen producing system where the amount of scrubber liquid is smaller in which case impurity removal by recirculation of the second scrubber liquid through adsorbents would be advantageous.

It will be seen that the incorporation of a scrubber and liquefier operating at 200 to 300 p. s. i. g. pressure in air separation cycles provides not only an important operating improvement for known types of air separation cycles but also has provided new and improved air separation cycle arrangements as described in connection with Figs. 2 and 3 so that, as will be appreciated by those skilled in the art, a specific system or cycle may be selected and modified according to the conditions of operation and character of separation product or products to be delivered.

According to customary practice all cold units of apparatus are to be well insulated to minimize the effects of undesirable heat leak from warmer surroundings.

The several embodiments and alternatives described herein disclose the application of the principles of the invention and it is contemplated that other modifications of process and apparatus may be made within the spirit and scope of the invention.

What is claimed is:

1. In a process for the separation of air containing atmospheric impurities including carbon dioxide by low temperature rectification in which the air is prepared for rectification by cooling steps including heat exchange with at least one product of rectification, by expansion to lower pressure, and at least partial liquefaction, and by subjecting the air to an impurity removing operation, and in which a stream of the air is provided at a supercritical pressure and cooled to a temperature such that substantially all its moisture content is eliminated, the improvement for avoiding carbon dioxide accumulations when cooling to liquefaction temperatures comprising the steps of cooling said air stream by indirect countercurrent heat exchange with a product stream of the rectification to a temperature of about −140° C. and above −155° C.; reducing the pressure of such cooled air stream to a first intermediate pressure between about 200 and 300 p. s. i. g. providing vapor and liquid portions thereof; scrubbing the vapor portions of said air stream at said first intermediate pressure with the liquid portion of said air stream, the carbon dioxide and other impurities being retained in the scrubber liquid portion; effecting at least partial liquefaction of the scrubbed vapor portion of said air stream at said first intermediate pressure by indirect heat exchange with a colder fluid of the system which subsequently becomes said product stream that is passed in heat exchange with the incoming air stream; subjecting at least the scrubber liquid portion of said air stream to an impurity removing operation; and passing said liquids to the product-producing rectification.

2. Process for the separation of air according to claim 1 in which said impurity removing operation includes scrubbing an additional stream of cooled air at a second intermediate pressure of between 60 and 120 p. s. i. g. with at least the liquid phase of said scrubber liquid portion after expansion to said second intermediate pressure, treating the so used scrubber liquid to eliminate impurities, and passing such cleaned scrubber liquid and the scrubbed air after at least partial liquefaction to the rectification.

3. Process for the separation of air according to claim 2 which includes adding at least part of the liquefied scrubbed vapor portion to said scrubbing at the second intermediate pressure to augment the scrubber liquid therein.

4. Process for the separation of air according to claim 1 which includes the steps of subjecting scrubber liquid to said impurity removing operation while it is substantially at said first intermediate pressure, further cooling such cleaned scrubber liquid, and transferring it after pressure reduction to the rectification.

5. In a process for the separation of air according to claim 1 in which said low temperature rectification is a two-stage rectification and said one product of rectification is the nitrogen-rich product of the lower pressure stage of rectification and wherein said nitrogen-rich product is passed in heat exchange with a product of the higher pressure stage of rectification and thereafter with scrubbed air vapor at the first intermediate pressure to produce a liquid air for said scrubbing at the first intermediate pressure and for warming the nitrogen-rich product to a temperature such that the first air stream is not cooled below said —155° C.

6. Process for the separation of air according to claim 1 in which at least part of the liquefied scrubbed vapor portion is throttled to lower pressure, and passed to the rectification.

7. Process for the separation of air according to claim 1 which includes adding one part of the liquefied scrubbed vapor portion to join with said scrubber liquid portion and passing another part after further cooling and pressure reduction to the rectification.

8. Process for the separation of air according to claim 1 in which said impurity removing operation includes scrubbing an additional stream of cooled air at a second intermediate pressure between 60 and 120 p. s. i. g. with a scrubber liquid, providing at least part of said scrubber liquid by adding at least part of the liquefied scrubbed vapor portion to said scrubbing, treating the so used scrubber liquid to eliminate impurities, and passing cleaned scrubber liquid and the scrubbed air after at least partial liquefaction to the rectification.

9. Process for the separation of air according to claim 1 in which the nitrogen-rich product of rectification is warmed by heat exchange with a liquid fraction to be fed to the rectification and by said indirect heat exchange for effecting liquefaction of the scrubbed vapor portion, and the warmed nitrogen product is employed for said indirect countercurrent heat exchange with said stream of the air, the warming of the product being to a temperature such that the air stream is cooled to said temperature of about —140° C. and above —155° C.

10. In a process for the separation of air containing atmospheric impurities including carbon dioxide by low temperature rectification in which a stream of air is provided at a supercritical pressure and cooled sufficiently that substantially all its moisture is eliminated, the steps of cooling said stream by indirect countercurrent heat exchange with at least one product of rectification to a temperature of about —140° C. and above —155° C.; reducing the pressure of the cooled stream to a first intermediate pressure between about 200 and 300 p. s. i. g.; scrubbing the stream with a liquid portion thereof at said first intermediate pressure; reducing the pressure of the liquid portion to a second intermediate pressure between 60 and 120 p. s. i. g. such that a portion thereof changes to vapor state and the remainder comprises a liquid fraction; scrubbing such vapor with said liquid fraction at said second intermediate pressure; subjecting the liquid fraction containing impurities scrubbed out of the air to an impurity removing operation; effecting heat exchanges with said one product of rectification including a heat exchange with scrubbed air vapor to produce liquid air and warm the product of rectification sufficiently before it is used to cool said air stream that said stream is cooled to the desired temperature of about —140° C. and above —155° C.; and passing the liquids to the rectification for separation into rectification products.

11. In a process for the separation of air by low temperature rectification in stages which air, containing atmospheric impurities including carbon dioxide, is provided at supercritical pressure and cooled sufficiently that substantially all its water vapor is eliminated, the steps of further cooling a first stream of such air by heat exchange with at least the nitrogen-rich product of separation to a temperature close to but not below —155° C.; scrubbing such air stream at a first intermediate pressure of from 200 to 300 p. s. i. g. with liquid air; expanding with the production of external work a second stream of such air to a second intermediate pressure from 60 to 120 p. s. i. g.; expanding said liquid air containing scrubbed out carbon dioxide to said second intermediate pressure such that a portion thereof flashes to vapor state and the remainder forms a liquid fraction of the first stream; scrubbing the expanded second stream and flashed vapor portion of the first stream with the liquid fraction which constitutes a scrubber liquid containing impurities; subjecting the scrubbed vapors to a higher pressure stage of rectification; subjecting scrubber liquid containing the impurities scrubbed out of both streams to an impurity removing operation; and passing cleaned scrubber liquid to a lower pressure stage of rectification.

12. In a process for the separation of air by low temperature rectification in stages which air, containing atmospheric impurities including carbon dioxide, is provided at supercritical pressure and cooled sufficiently that substantially all its water vapor is eliminated, the steps of further cooling a first stream of such air by heat exchange with at least the nitrogen-rich product of separation to a temperature close to but not below —155° C.; reducing the pressure of and scrubbing such air stream at a first intermediate pressure of from 200 to 300 p. s. i. g. with liquid air; forming such liquid air by liquefaction of scrubbed air portions by heat exchange with nitrogen-rich separation product prior to said first-mentioned heat exchange; expanding said liquid air to a second intermediate pressure of from 60 to 120 p. s. i. g. such that a portion thereof flashes to vapor state and the remainder forms a liquid fraction of the first stream; expanding with the production of external work a second stream of such air to said second intermediate pressure; scrubbing the expanded second stream and flashed vapor portion of the first stream with the liquid fraction; subjecting scrubber liquid containing the impurities scrubbed out of both streams to an impurity removing operation; and passing cleaned scrubber liquid to a lower pressure stage of rectification; subjecting the scrubbed vapors to a higher pressure stage of rectification to form a crude oxygen enriched liquid and nitrogen-rich liquid; and passing such liquids respectively to intermediate and upper zones of the lower pressure stage of rectification.

13. A system for the separation of air according to claim 19 which includes means for providing a second stream at a lower pressure and cooled to a temperature close to its condensation temperature at said lower pressure and for introducing such second stream into said second scrubber means to be scrubbed therein.

14. A system for the separation of air according to claim 19 which includes an expander connected for expanding a second stream of the air to the lower pressure with a production of external work; and means for introducing such second stream into said second scrubber means to be scrubbed therein.

15. In a process for the separation of air containing atmospheric impurities including carbon dioxide by low temperature rectification in which the air is prepared for rectification by cooling steps including heat exchange with at least one product of rectification, by expansion to lower pressure, and at least partial liquefaction, and by subjecting the air to an impurity removing operation, and in which a stream of the air is provided at a supercritical pressure and cooled to a temperature such that substantially all its moisture content is eliminated, the improvement for avoiding carbon dioxide accumulations when cooling to liquefaction temperatures comprising the steps of cooling said stream by indirect countercurrent heat exchange with at least a part of one product of rectification to a temperature of about −140° C. and above −155° C.; reducing the pressure of such cooled stream to a first intermediate pressure between about 200 and 300 p. s. i. g. providing vapor and liquid portions thereof; scrubbing the vapor portions of this stream at said first intermediate pressure with the liquid portion of said stream, the carbon dioxide and impurities being retained in the scrubber liquid portion; reducing the pressure of the scrubber liquid portion to a second intermediate pressure between 60 and 120 p. s. i. g.; scrubbing an additional stream of cooled air at said second intermediate pressure with a liquid air fraction to collect residual carbon dioxide and impurities in the liquid air fraction; treating said scrubber liquid portion and said liquid air fraction to remove carbon dioxide and impurities therefrom; effecting heat exchange between at least said part of one product of rectification employed for said indirect countercurrent heat exchange and scrubbed air to liquefy at least part of same and warm the product to a temperature such that said air stream is cooled to the desired temperature above about −155° C.; and passing the treated scrubber liquid portion and liquid air fraction to the rectification together with at least portions of liquefied scrubber air.

16. In a process for the separation of air containing atmospheric impurities including carbon dioxide by low temperature rectification in which a stream of air is provided at a supercritical pressure and cooled sufficiently that substantially all its moisture is eliminated, the steps of cooling said stream by indirect countercurrent heat exchange with at least one product of rectification to a temperature of about −140° C. and above −155° C.; reducing the pressure of such cooled stream to a pressure between about 200 and 300 p. s. i. g.; scrubbing such stream with liquid air, the impurities being retained in the liquid air; effecting heat exchange between cleaned scrubbed air and said one product of rectification to liquefy at least part of such air and to warm the product of rectification sufficiently before it is used to cool said air stream that said air stream is only cooled to the desired temperature of about −140° C. and −155° C.; subjecting scrubber liquid to an impurity removing operation; and passing said liquids to the rectification.

17. Process for the separation of air according to claim 10 which includes selectively passing desired amounts of liquefied scrubbed air ranging from zero to 100% thereof to join said liquid portion, to join said liquid fraction, and to the rectification after further cooling and pressure reduction.

18. In a system for the separation of air by low temperature rectification in associated higher and lower pressure rectification columns including means for providing the air in compressed state and cooled to a temperature such that substantially all its water vapor is eliminated, the combination therewith of first heat exchange means for passing at least one product of rectification in countercurrent heat exchange relation with a stream of such air to cool such air to a temperature of about −140° C. and above −155° C.; means for reducing the pressure of such cooled air to an intermediate pressure; scrubber means connected to receive and scrub such cooled air stream with liquid air; second heat exchange means for passing at least one product of rectification in heat exchange relation with scrubbed air, before passing such product through said first heat exchange means, to form liquid air and to warm said one product of rectification to a temperature such that when it is subsequently passed through said first heat exchange means, the stream of air is cooled only to said temperature of about −140° C. and above −155° C.; and impurity removing means connected to receive, and eliminate impurities from, scrubbing liquid from said scrubber means, means for passing said liquids to the lower pressure rectifying column.

19. In a system for the separation of air by low temperature rectification in associated higher and lower pressure rectification columns including means for providing the air in compressed state and cooled to a temperature such that substantially all its water vapor is eliminated, the combination therewith of first heat exchange means for passing at least one product of rectification in countercurrent heat exchange relation with a stream of such air to cool such air to a temperature of about −140° C. and above −155° C.; means for reducing the pressure of such cooled air to an intermediate pressure; a first scrubber means connected to receive and scrub such cooled air stream with liquid air; second heat exchange means for passing at least said one product of rectification in heat exchange relation with scrubbed air, before passing such product through said first heat exchange means, to form liquid air and to warm said one product of rectification to a temperature such that when it is subsequently passed through said first heat exchange means, the stream of air is cooled only to said temperature of about −140° C. and above −155° C.; means for expanding liquid air from the first scrubber means to a lower pressure; a second scrubber means connected to receive and scrub the vapor of such latter expansion with the liquid fraction after such expansion; means connected between the second scrubber means and the higher pressure rectifying column for passing the scrubbed vapor thereto; impurity removing means connected to receive, and eliminate impurities from, scrubbing liquid from said second scrubber means, and conduit means for passing liquid from at least one of said scrubber means to the lower pressure rectifying column.

20. In a system for the separation of air by low temperature rectification in associated higher and lower pressure rectification columns including means for providing the air in compressed state and cooled to a temperature such that substantially all its water vapor is eliminated, the combination therewith of first heat exchange means for passing at least one product of rectification in countercurrent heat exchange relation with a stream of such air to cool such air to a temperature of about −140° C. and above −155° C.; means for reducing the pressure of such cooled air to an intermediate pressure; scrubber means connected to receive and scrub such cooled air stream with liquid air; second heat exchange means for passing at least said one product of rectification in heat exchange relation with scrubbed air to form liquid air and to warm said one product of rectification to a temperature such that the stream of air is cooled only to said temperature of about −140° C. and above −155° C.; impurity removing means connected to receive, and eliminate impurities from, scrubbing liquid from said scrubbing means, heat exchange means for further cooling such cleaned scrubber liquid, and means for throttling and passing cooled cleaned liquid from said last-mentioned heat exchange means to the lower pressure rectifying column.

21. A system for the separation of air according to claim 19, which includes conduit means including separate passages connecting said second heat exchange means to said first scrubber means, said second scrubber and said lower pressure rectifying column, and control means for selectively regulating flow through said separate passages for maintaining desired liquid levels in both of said scrubber means.

22. In a process for the separation of air containing atmospheric impurities including carbon dioxide by low temperature rectification in which a stream of air is provided at a supercritical pressure and cooled sufficiently that substantially all its moisture is eliminated, the steps of cooling said stream by indirect countercurrent heat exchange with at least one product of rectification to a temperature of about −140° C. and above −155° C.; reducing the pressure of such cooled stream to a pressure between about 200 and 300 p. s. i. g.; scrubbing such stream with liquid air, the impurities being retained in the liquid air; effecting heat exchange between cleaned scrubbed air and said one product of rectification to liquefy at least part of such air and to warm the product of rectification sufficiently before it is used to cool said air stream that said air stream is only cooled to the desired temperature of about −140° C. and above −155° C.; subjecting at least scrubber liquid to an impurity removing operation; warming unliquefied scrubber air and therefter expanding the same with the production of external work; and passing said liquids and said expanded unliquefied scrubbed air to the rectification.

23. In a process for the separation of air containing atmospheric impurities including carbon dioxide by low temperature rectification in which a stream of air is provided at a supercritical pressure and cooled sufficiently that substantially all its moisture is eliminated, the steps of cooling said stream by indirect countercurrent heat exchange with at least one product of rectification to a temperature of about −140° C. and above −155° C.; reducing the pressure of the cooled stream to a first intermediate pressure between about 200 and 300 p. s. i. g.; scrubbing the stream with a liquid portion thereof at said first intermediate pressure; expanding scrubbed air at said first intermediate pressure to condensation pressure with the production of external work; reducing the pressure of the liquid portion to a second intermediate pressure between 60 and 120 p. s. i. g. such that a portion thereof changes to vapor state and the remainder comprises a liquid fraction; scrubbing such vapor with said liquid fraction at said second intermediate pressure; subjecting the liquid fraction containing impurities scrubbed out of the air to an impurity removing operation; passing work expanded scrubbed air from said first expansion and scrubbed air vapor at said second intermediate pressure through another work expansion; effecting heat exchanges with said one product of rectification including a heat exchange with scrubbed air vapor to produce liquid air and warm the product of rectification sufficiently before it is used to cool said air stream that said stream is cooled to the desired temperature of about −140° C. and above −155° C.; and passing the liquids to the rectification for separation into rectification products.

24. In a system for the separation of air by low temperature rectification in associated higher and lower pressure rectification columns including means for providing the air in compressed state and cooled to a temperature such that substantially all its water vapor is eliminated, the combination therewith of first heat exchange means for passing at least one product of rectification in countercurrent heat exchange relation with a stream of such air to cool such air to a temperature of about −140° C. and above −155° C.; means for reducing the pressure of such cooled air to an intermediate pressure; scrubber means connected to receive and scrub such cooled air stream with liquid air; second heat exchange means for passing at least said one product of rectification in heat exchange relation with scrubbed air to form liquid air and to warm said one product of rectification to a temperature such that the stream of air is cooled only to said temperature of about −140° C. and above −155° C.; and impurity removing means connected to receive, and eliminate impurities from, scrubbing liquid from said scrubber means, means for warming unliquefied scrubbed air; an expander connected for expanding unliquefied scrubbed air after such warming with the production of work; means for passing said liquids to the lower pressure rectifying column.

25. In a system for the separation of air by low temperature rectification in associated higher and lower pressure rectification columns including means for providing the air in compressed state and cooled to a temperature such that substantially all its water vapor is eliminated, the combination therewith of first heat exchange means for passing at least one product of rectification in countercurrent heat exchange relation with a stream of such air to cool such air to a temperature of about −140° C. and above −155° C.; means for reducing the pressure of such cooled air to an intermediate pressure; a first scrubber means connected to receive and scrub such cooled air stream with liquid air; second heat exchange means for passing at least said one product of rectification in heat exchange relation with scrubbed air to form liquid air and to warm said one product of rectification to a temperature such that the stream of air is cooled only to said temperature of about −140° C. and above −155° C.; a first expander connected for expanding unliquefied scrubbed air to a lower pressure with the production of external work; means for expanding liquid air from the first scrubber means to said lower pressure; a second scrubber means connected to receive and scrub the vapor of such latter expansion with the liquid fraction after such expansion; a second expander connected for expanding air vapor from said second scrubber means and scrubbed air from said first expander with the production of external work; means connected between the second scrubber means and the higher pressure rectifying column for passing the scrubbed vapor thereto; impurity removing means connected to receive, and eliminate impurities from, scrubbing liquid from said second scrubber means, and conduit means for passing liquid from at least one of said scrubber means to the lower pressure rectifying column.

26. A system for the separation of air according to claim 24, wherein said expander is a turbo-expander.

27. Process for the separation of air according to claim 22 in which said scrubbed air warming step includes passing at least part of a product of rectification from an intermediate point of the countercurrent heat exchange in heat exchange relation with unliquefied scrubbed air and passing such product after such heat exchange in heat exchange relation with said stream.

References Cited in the file of this patent

UNITED STATES PATENTS

| | | |
|---|---|---|
| 2,572,933 | Houvener | Oct. 30, 1951 |
| 2,619,810 | Rice et al. | Dec. 2, 1952 |